(12) United States Patent
Oh et al.

(10) Patent No.: US 10,855,116 B2
(45) Date of Patent: Dec. 1, 2020

(54) WIRELESS POWER TRANSMITTER

(71) Applicant: WITS Co., Ltd., Yongin-si (KR)

(72) Inventors: Soon Tack Oh, Suwon-si (KR); Byoung Woo Ryu, Suwon-si (KR); Ji Hoon Kim, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 407 days.

(21) Appl. No.: 15/691,029

(22) Filed: Aug. 30, 2017

(65) Prior Publication Data

US 2018/0097408 A1   Apr. 5, 2018

(30) Foreign Application Priority Data

Oct. 4, 2016   (KR) .................. 10-2016-0127743

(51) Int. Cl.
*H02J 50/60*   (2016.01)
*H02J 50/12*   (2016.01)
*H02J 7/02*    (2016.01)

(52) U.S. Cl.
CPC ............. *H02J 50/60* (2016.02); *H02J 7/025* (2013.01); *H02J 50/12* (2016.02)

(58) Field of Classification Search
CPC ......... H02J 7/0042; H02J 7/0052; H02J 50/60

USPC ................................ 320/107, 108, 115, 134
See application file for complete search history.

(56) References Cited

U.S. PATENT DOCUMENTS

2015/0311725 A1*  10/2015  Yamamoto ............. G01V 3/104
                                                      307/104
2016/0322853 A1*  11/2016  Porat ...................... H02J 50/12

FOREIGN PATENT DOCUMENTS

| JP | 5656698 B2 | 1/2015 |
| JP | 2015-216828 A | 12/2015 |
| KR | 10-1213649 B1 | 12/2012 |

\* cited by examiner

*Primary Examiner* — Edward Tso
*Assistant Examiner* — Aaron Piggush
(74) *Attorney, Agent, or Firm* — Harness, Dickey & Pierce, P.L.C.

(57) ABSTRACT

A power transmitter includes: a first resonator configured to wirelessly supply power to a power receiver and having an impedance that changes in response to a foreign material being proximate to the power transmitter; a second resonator having an impedance that changes in response to the foreign material being proximate to the power receiver; and controller configured to select either one of the first resonator and the second resonator in response to a wireless charging control, and to determine whether the foreign material is proximate to the power transmitter, based on a change in the impedance of the selected one of the first resonator and the second resonator.

14 Claims, 6 Drawing Sheets

WIRELESS POWER TRANSMITTER

CROSS-REFERENCE TO RELATED APPLICATIONS

This application claims benefit under 35 U.S.C. § 119(a) of Korean Patent Application No. 10-2016-0127743, filed on Oct. 4, 2016 in the Korean Intellectual Property Office, the entire disclosure of which is incorporated herein by reference for all purposes.

BACKGROUND

1. Field

The following description relates to a wireless power transmitter.

2. Description of Related Art

In accordance with the development of wireless technology, various wireless functions range from the transmission of data to the transmission of power. In particular, a wireless power transmission technology capable of charging an electronic device with the power even in a non-contact state (e.g., a state in which the electronic device is not in physical contact with a wireless power transmitter) has recently been developed.

Since the above-mentioned wireless power transmission technology forms a strong magnetic field, it is important to detect whether or not foreign materials exist within the magnetic field.

A conventional technology of detecting foreign materials that may be present within a magnetic field generated by wireless charging includes checking impedance variation of a transmission resonator before initiating the wireless charging to detect whether or not the foreign materials exist. However, this technology has a problem in that the existence of the foreign materials may not be detected during the wireless charging.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power transmitter includes: a first resonator configured to wirelessly supply power to a power receiver and having an impedance that changes in response to a foreign material being proximate to the power transmitter; a second resonator having an impedance that changes in response to the foreign material being proximate to the power receiver; and a controller configured to select either one of the first resonator and the second resonator in response to a wireless charging control, and to determine whether the foreign material is proximate to the power transmitter, based on a change in the impedance of the selected one of the first resonator and the second resonator.

The power transmitter may further include: a first detector configured to detect the change in the impedance of the first resonator and to provide the detected change in the impedance of the first resonator to the controller; and a second detector configured to detect the change in the impedance of the second resonator and to provide the detected change in the impedance of the second resonator to the controller.

The second resonator may have resonance characteristics corresponding to resonance characteristics of the first resonator.

The controller may be further configured to determine whether the foreign material is proximate to the power transmitter based on the change in the impedance of the first resonator during a preparation of a wireless charging.

The controller may be further configured to determine whether the foreign material is proximate to the power receiver based on the change in the impedance of the second resonator during wireless charging.

The power transmitter may further include a wireless tag reader configured to sense a wireless tag disposed proximate to the power receiver.

The controller may be further configured to determine whether the foreign material is the wireless tag based on an output of the wireless tag reader, in response to the controller determining that the foreign material is proximate to the power transmitter.

The controller may be further configured to stop a preparation procedure for a wireless charging, in response to a change in the impedance of the first resonator being detected and the wireless tag reader sensing the wireless tag during the preparation procedure for the wireless charging.

The controller may be further configured to stop wireless charging, in response to the change in the impedance of the second resonator being detected and the wireless tag reader sensing the wireless tag during the wireless charging.

In another general aspect, a power transmitter includes: a first resonator configured to wirelessly supply power to a power receiver, and having an impedance that changes in response to a foreign material being proximate to the power receiver; a second resonator having an impedance that changes in response to the foreign material being proximate to the power receiver; and a wireless tag reader configured to sense a wireless tag disposed proximate to the power receiver while the first resonator wirelessly supplies the power to the power receiver, in response to a change in the impedance of the second resonator being detected while the first resonator wirelessly supplies the power to the power receiver.

The power transmitter may further include: a first detector configured to detect a change in the impedance of the first resonator; and a second detector configured to detect the change in the impedance of the second resonator.

The second resonator may have resonance characteristics that correspond to resonance characteristics of the first resonator.

The first resonator may be configured to stop power transmission to the power receiver, in response to the wireless tag reader sensing the wireless tag.

The wireless tag reader may be configured to sense a wireless tag disposed proximate to the power receiver during a preparation of a wireless charging, in response to the change in the impedance of the first resonator being detected during the preparation of the wireless charging.

The first resonator may be configured to stop the preparation of the wireless charging, in response to the wireless tag reader sensing the wireless tag disposed proximate to the power receiver during the preparation of the wireless charging.

The first resonator and the second resonator may each be formed of a wire configured in a coil shape. The second resonator may be wound around a periphery the first resonator.

The first resonator and the second resonator may be formed on a same substrate.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
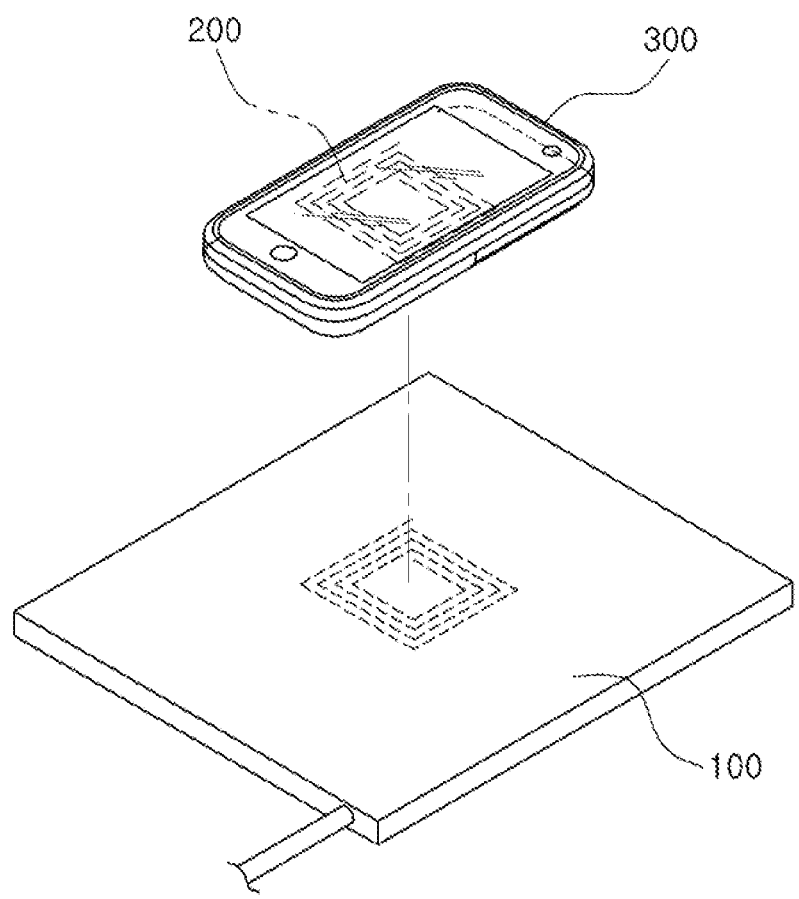
FIG. 1 is a diagram illustrating an application of a wireless power transmitter, according to an embodiment.

FIG. 1 is a diagram illustrating an application of a wireless power transmitter 100, according to an exemplary embodiment.

Referring to FIG. 1, a wireless power receiver 200 is adjacent to, or in a vicinity of, a wireless power transmitter 100 to be magnetically coupled (e.g., magnetically resonate with or produce a magnetically induced current) to the wireless power transmitter 100, thereby wirelessly receiving power.

The wireless power receiver 200 provides the received power to an electronic device 300. The wireless power receiver 200 may exist as a component in the electronic device 300, or may be a separate device connected to the electronic device 300.

Although not shown in FIG. 1, foreign materials, objects or devices may exist around the wireless power transmitter 100. In a conventional wireless power transmitter, a wireless charging control procedure includes a wireless power receiver sensing procedure that is merely capable of sensing and identifying a wireless power receiver. Therefore, according to an embodiment, to improve upon the conventional art, the wireless power transmitter 100 is capable of sensing a foreign material even during a wireless charging operation and in a procedure of preparing the wireless charging operation.

Hereinafter, the wireless power transmitter 100, according to embodiments, will be described with reference to FIGS. 2 through 6.

Figure 2:
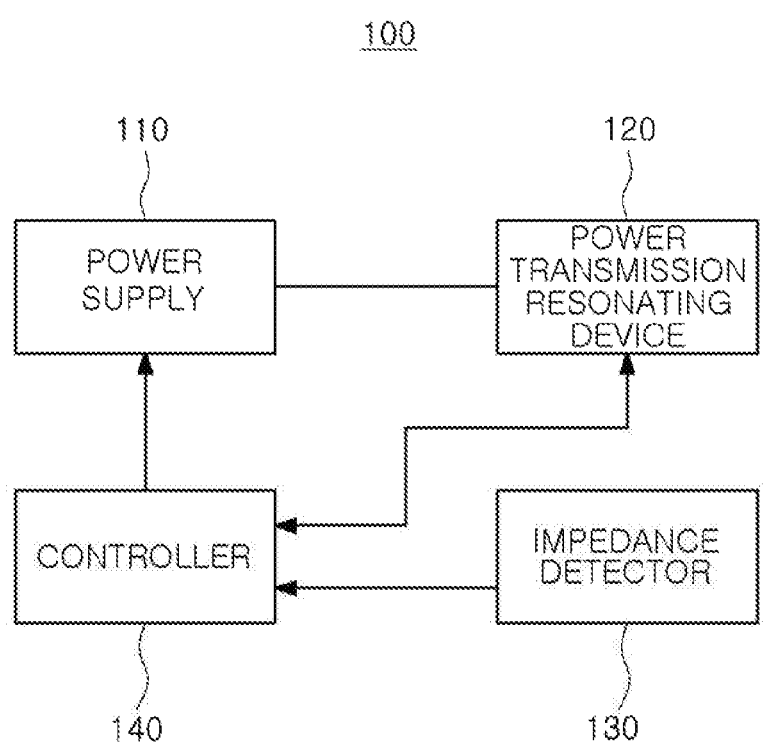
FIG. 2 is a block diagram illustrating the wireless power transmitter, according to an embodiment.

FIG. 2 is a circuit diagram illustrating the wireless power transmitter 100, according to an embodiment.

Referring to FIG. 2, the wireless power transmitter 100 includes a power transmission resonating device 120, an impedance detector 130, and a controller 140. The wireless power transmitter 100 further includes a power supply 110.

The power supply 110 supplies an alternate current (AC) to the power transmission resonating device 120, and the power transmission resonating device 120 produces a magnetic field to wirelessly supply power to the wireless power receiver.

The power transmission resonating device 120 includes a power transmission resonator, and the power transmission resonator is magnetically coupled to a power reception resonator of the wireless power receiver to wirelessly supply the power to the wireless power receiver. An impedance of the power transmission resonator changes in response to a foreign material being present proximate to the wireless power transmitter 100, for example, at the periphery of the wireless power receiver 200 and, for example, within a distance at which the wireless power receiver 200 can be charged with electricity.

In addition, the power transmission resonating device 120 includes a first detector configured to detect a change in the impedance of the resonator of power transmission.

Various wireless charging schemes, for example, a magnetic resonance scheme, and a magnetic induction scheme, may be applied to the power transmission resonating device 120.

The impedance detector 130 includes a detection resonator that is separate from the power reception resonator. An impedance of the detection resonator changes in response to a foreign material being present proximate to the wireless power receiver 200.

The impedance detector 130 detects a change in impedance of the detection resonator and provides the detected impedance change to the controller 140.

The controller 140 controls the power supply 110 to control an operation of the wireless power transmitter 100.

According to an embodiment, the power transmission resonator included in the power transmission resonating device 120 and the detection resonator included in the impedance detector 130 are respectively provided, and the changes in the impedances of the power transmission resonator and the detection resonator are respectively detected.

The controller 140 selects either one of the power transmission resonator and the detection resonator corresponding to the wireless charging control procedure, and determines whether a foreign material is adjacent to, or proximate to, the wireless power transmitter based on the change in the impedance of the selected one of the power transmission resonator and the detection resonator.

As an example, the controller 140 determines whether a foreign material is adjacent to, or proximate to, the wireless power transmitter 100 based on the change in the impedance of the power transmission resonator during a preparation of a wireless charging.

As another example, the controller 140 determines whether the foreign material which is adjacent to, or proximate to, the wireless power transmitter 100 the change in the impedance of the detection resonator during the execution of the wireless charging.

The controller 140 includes at least one processor. According to an embodiment, the controller 140 further includes a memory. The processor includes, for example, a central processing unit (CPU), a graphic processing unit (GPU), a microprocessor, an application specific integrated circuit (ASIC), or field programmable gate arrays (FPGA), and may have multiple cores. The memory may be a volatile memory (e.g., a random access memory (RAM), or the like), a non-volatile memory (e.g., a read only memory (ROM), a flash memory, or the like), or a combination of a volatile memory and a non-volatile memory.

Hereinafter, the wireless charging control procedure will be described in more detail with reference to FIG. 3.

Figure 3:
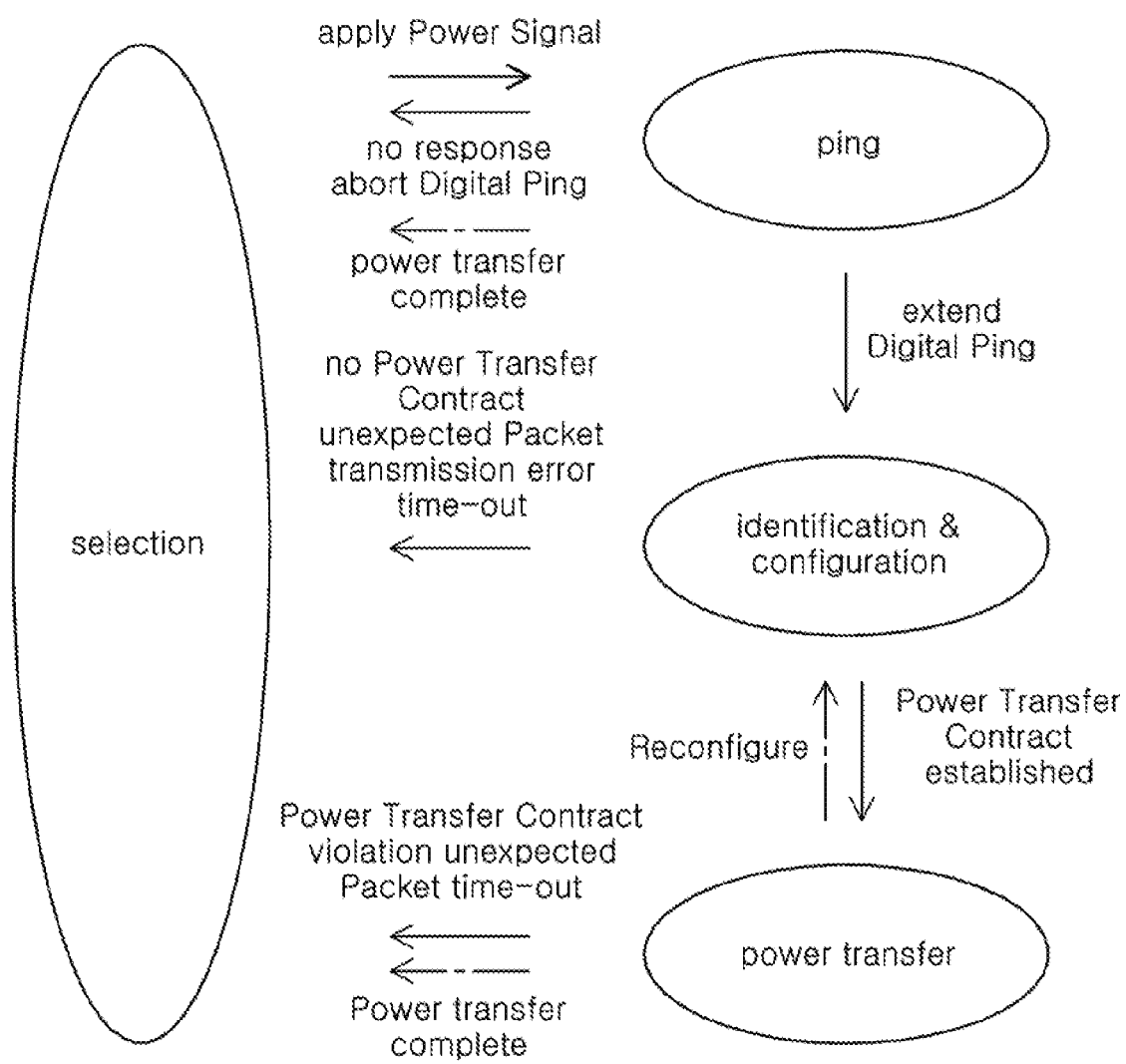
FIG. 3 is a diagram illustrating phases of performing a wireless power transmission, according to an embodiment.

FIG. 3 is a diagram illustrating phases of wireless power transmission, and the phases of wireless power transmission will be described with reference to FIG. 3.

Referring to FIG. 3, in order to wirelessly transmit power, a selection phase is initially performed. In the selection phase, the wireless power transmitter 100 transmits an external device detecting signal through the power transmission resonating device 120.

The external device detecting signal, which is a signal for detecting whether an object is present outside, may be a signal having small amplitude transmitted from the power transmission resonating device 120, for example, a short beacon signal.

In response to a change in the external device detecting signal occurring, for example, in response to a change in the impedance of the power transmission resonating device occurring, the wireless power transmitter 100 determines that a specified or predetermined external object is positioned proximate to the wireless power transmitter 100.

If it is determined in the selection phase that the specified or predetermined external object is adjacent to, or proximate to, the wireless power transmitter 100, the wireless power transmitter 100 then transmits a digital ping signal, in a ping phase, to confirm whether a target object of the wireless power transmitter 100 is the wireless power receiver 200. The digital ping signal may also be performed in separate short-range wireless communications such as Bluetooth communications.

If the wireless power receiver 200 receives the digital ping signal, the wireless power receiver 200 transmits a response signal corresponding to the digital ping signal. The response signal may include any one of signal strength information, information on a type of the wireless power receiver, information on required power, and information on a voltage.

Therefore, in an identification and configuration phase, the wireless power transmitter 100 identifies a target and a power demand using the response signal of the wireless power receiver 200 for the digital ping signals.

Thereafter, in a power transfer phase, the wireless power transmitter 100 wirelessly provides the power using the identified information.

Since the power transmission resonator performs an operation of transmitting the power during the execution of the wireless power transmission (in the power transfer phase), it is impossible to determine whether the external object approaches the wireless power transmitter using the power transmission resonator.

Therefore, the wireless power transmitter 100 is configured to determine an existence of the external object during the execution of the wireless power transmission (power transfer phase), based on the change in the impedance of the detection resonator, by using the impedance detector 130 including the detection resonator.

Figure 4:
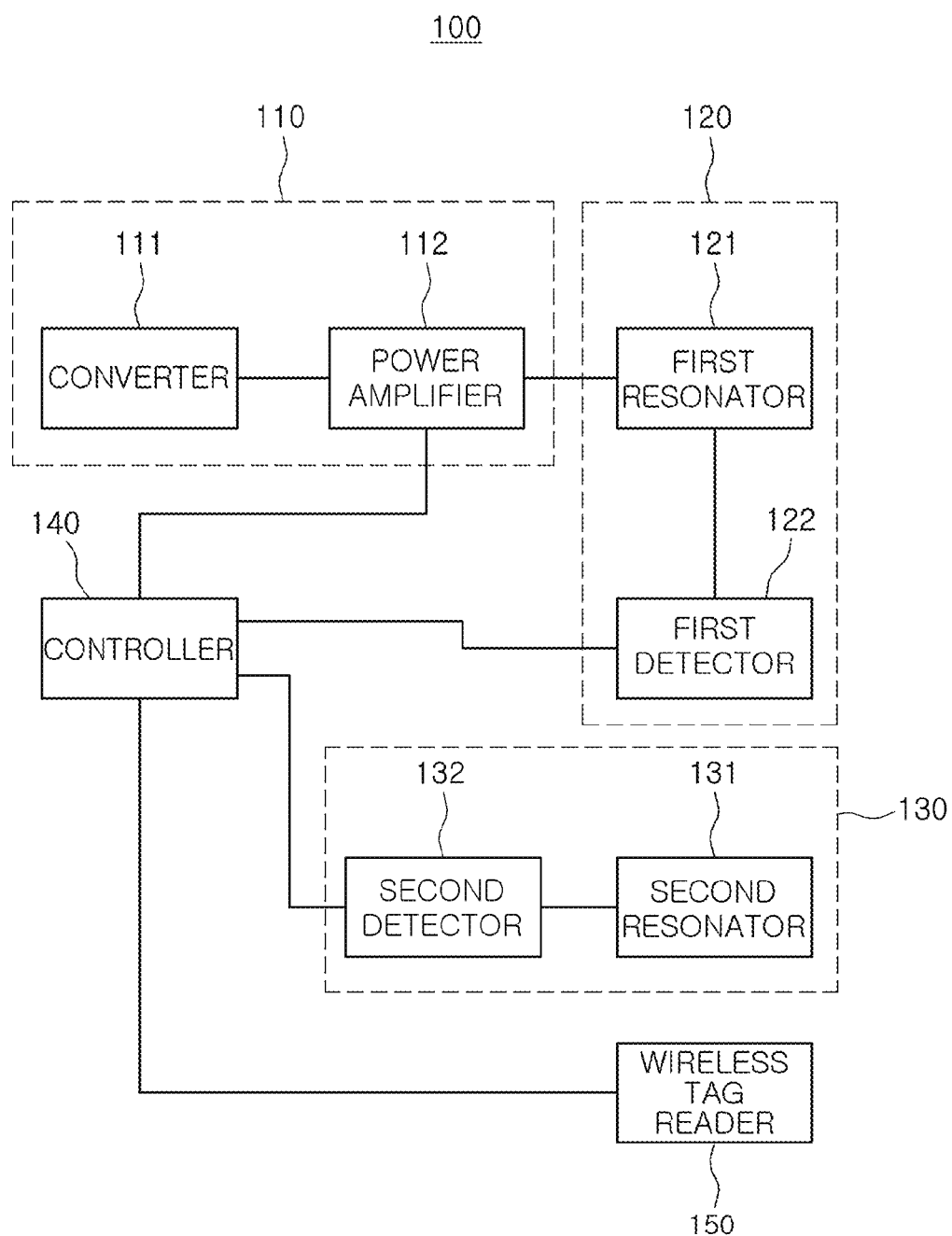
FIG. 4 is a block diagram illustrating a detailed configuration of the wireless power transmitter illustrated in FIG. 2, according to an embodiment.

FIG. 4 is a block diagram illustrating a detailed configuration of the wireless power transmitter 100, according to an embodiment.

Referring to FIG. 4, the power supply 110 includes a converter 111 and a power amplifier 112. The converter 111 coverts input power into power suitable for the power amplifier 112, for example, a direct current (DC) voltage, and the power amplifier 112 operates a first resonator (power transmission resonator) 121 based on the DC voltage.

The power transmission resonating device 120 includes a first detector 122, in addition to the first resonator 121, and the first detector 122 detects a change in the impedance of the first resonator 121, and provides information regarding the change in the impedance of the first resonator 121 to the controller 140.

The impedance detector 130 includes a second resonator (detection resonator) 131, and a second detector 132 for detecting a change in the impedance of the second resonator 131, to provide information regarding the detected change in the impedance of the second resonator 131 to the controller 140.

The first detector 122 and the second detector 132 may include circuits that measure the impedances of the first resonator 121 and the second resonator 132, respectively. However, since various circuits that measure the impedance of the resonator are known, a detailed description of such circuits will be omitted herein.

According to an embodiment, the detection resonator 131 has resonance characteristics corresponding to resonance characteristics of the second resonator 121. In addition, the first detector 122 may be implemented in a configuration corresponding to a configuration of the second detector 132. Therefore, since the controller 400 responds to changes in the impedances of the first and second detectors 122 and 132 in the same manner, the design and implementation of the wireless power transmitter 100 may be facilitated.

As described above, the controller 140 determines whether foreign material is proximate to the wireless power transmitter 100 based on a change in the impedance of the first resonator 121 during a preparation for the wireless charging, for example, the selection phase to the identification & configuration phase.

In addition, the controller 140 determines whether a foreign material is proximate to the wireless power transmitter 100 based on a change in the impedance of the second resonator 131 during the power transfer phase in which the wireless charging is executed.

According to an embodiment, the wireless power transmitter 100 includes a wireless tag reader 150. The wireless tag reader 150, which is a reader capable of sensing a wireless tag which is present in a region proximate to the wireless power receiver 200, corresponds, for example, to a near field communication (NFC) reader.

The wireless tag is an object that is wirelessly operable with the wireless tag reader 150. The wireless tag may be a tag that wirelessly transmits or receives information data from the wireless tag reader 150, or wirelessly receives power from the wireless tag reader 150. For example, the wireless tag is an NFC card that receives the power from the wireless tag reader 150, to wirelessly transmit the information data.

If the change in the impedance of the first resonator 121 for the second resonator 131 is sensed and it is determined that the foreign material exists, the controller 140 determines whether the foreign material is the wireless tag based on an output of the wireless tag reader 150.

Damage may be caused to the wireless tag when the wireless tag is exposed to a magnetic field for wireless charging for a long period of time. The controller 140 therefore determines whether the foreign material is the wireless tag to allow the controller 140 to perform a control operation to prevent damage to the wireless tag by stopping the power transmission, in response to the foreign material being determined to be the wireless tag.

That is, the controller 140 stops a procedure of preparing the wireless charging, in response to the change in the impedance of the first resonator being detected and the wireless tag reader 150 sensing an existence of the wireless tag during the procedure of preparing the wireless charging.

Alternatively, the controller 140 prevents the damage to the wireless tag by immediately stopping the wireless charging, when the change in the impedance of the second resonator 131 is detected and the wireless tag reader 150 senses the existence of the wireless tag during the wireless charging.

According to an embodiment, the wireless tag reader 150 performs an operation of sensing the wireless tag that exists in a region proximate to the wireless power receiver 200, in response to the change in the impedance of the second resonator 131 being detected while the first resonator 121 wirelessly supplies the power to the wireless power receiver 200. This operation is performed to allow the wireless tag reader 150 to quickly determine the existence of the wireless tag by operating the wireless tag reader 150 according to the above-mentioned conditions before the control of the controller 140 is performed. In this case, when the wireless tag reader 150 senses the wireless tag, the power transmission resonating device 120 stops the power transmission to the wireless power receiver 200.

According to an embodiment, the wireless tag reader 150 performs an operation of sensing the wireless tag that exists in the region proximate to the wireless power receiver 200, in response to the change in the impedance of the first resonator 121 being detected during the procedure of preparing the wireless charging. In this case, the power transmission resonating device 120 stops the procedure of preparing the wireless charging for the wireless power receiver 200, in response to the wireless tag reader sensing the wireless tag during the procedure of preparing the wireless charging.

Figure 5:
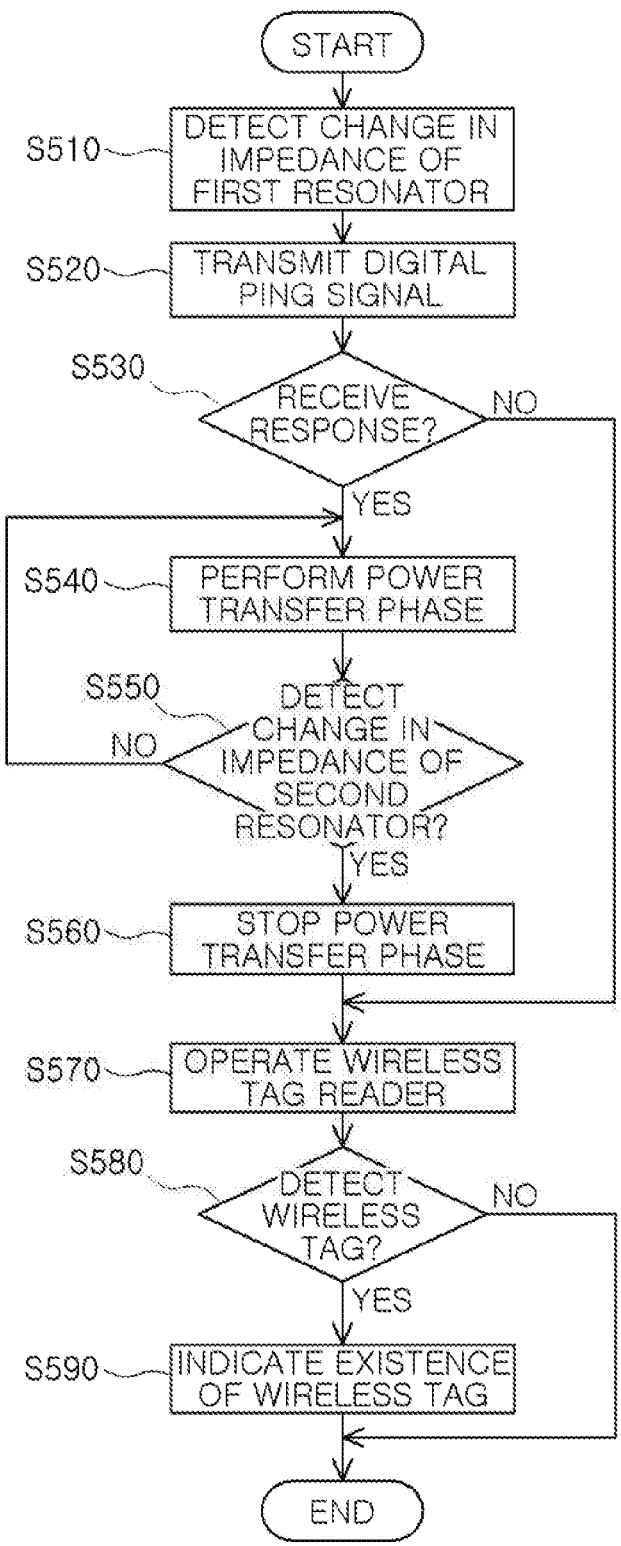
FIG. 5 is a flowchart illustrating an example of a control method performed in a controller illustrated in FIG. 2, according to an embodiment.

FIG. 5 is a flowchart illustrating a control method performed in the controller 140, according to an embodiment.

Referring to FIG. 5, in operation S510, the controller 140 detects the change in the impedance of the first resonator (power transmission resonator) 121, and transmits the digital ping signal in operation S520.

If a response to the digital ping signal is received from the wireless power receiver 200 in operation S430, the controller 140 performs the power transfer phase in operation S540.

During the power transfer phase, in operation S550, the controller 140 detects whether the change in the impedance of the second resonator (detection resonator) 131 occurs. If the controller 140 detects the change in the impedance of the second resonator 131, the controller 140 stops the power transfer phase in operation S560.

Next, in operation S570, the controller 140 operates the wireless tag reader 150 to determine whether the foreign material is the wireless tag. If the controller 140 determines that the foreign material is the wireless tag in operation S580, the controller 140 indicates the existence of the wireless tag in operation S590. For example, the indicating of the existence of the wireless tag includes transmitting a signal to the power amplifier 112 to prevent charging of the wireless power receiver 200.

In this example, since the power transfer phase is immediately stopped, the damage on the wireless tag may be prevented. However, in another embodiment, the operation S560 of stopping the power transfer phase may also be performed after determining that the foreign material is the wireless tag in operation S580. In such an embodiment, the operation S590 of indicating the existence of the wireless tag may be performed before the operation S560 of stopping the power transfer phase, and may include sending a signal to the power amplifier 112 to stop or prevent charging of the wireless power receiver 200.

Figure 6:
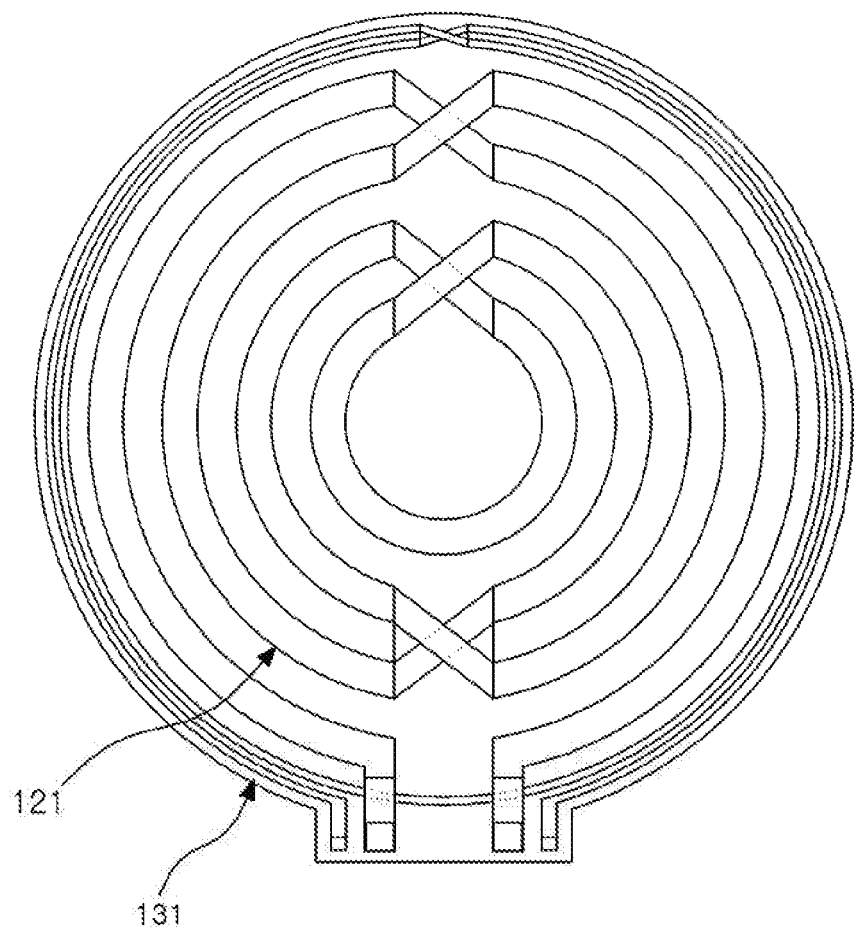
FIG. 6 is a diagram illustrating an implementation of a power transmission resonator and a resonator for detection, according to an embodiment.

FIG. 6 is a diagram illustrating an implementation of the first resonator (power transmission resonator) 121 and the second resonator (detection resonator) 131, according to an embodiment.

FIG. 6 illustrates an example in which the first resonator 121 and the second resonator 131 are implemented on a single (same) substrate. The first resonator 121 and the second resonator 131 are each formed of a respective wire configured in a coil shape and having multiple turns.

Since the first resonator 121 is for power transmission, it is wound around a center so as to have, relative to the second resonator 122, a higher number of turns and a wider wire area/thicker wire.

It can be seen that the second resonator 122 is wound outside (e.g., around a periphery) the first resonator 121 has, relative to the first resonator 121, a lower number of turns and a narrower wire area/thinner wire.

The power transmission resonating device 120 or the impedance detector 130 provides spatial optimization and accuracy of the detection by implementing the power transmission resonator 121 and the detection resonator 122 on the single substrate, as illustrated in FIG. 6.

As set forth above, according to the embodiments disclosed herein, a wireless power transmitter may detect a foreign material even during wireless charging.

In addition, since the wireless power transmitter, according to an embodiment, detects a foreign material by selecting the resonator to detect the foreign material according to a wireless charging process, the wireless power transmitter may be optimized for each procedure of the wireless charging to detect the foreign material.

The impedance detector 130, the converter 111, the first detector 122, the second detector 132, the controller 140 and the wireless tag reader 150 in FIGS. 2 and 4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power transmitter, comprising:
a first resonator having a first impedance, the first resonator configured to wirelessly supply power to a power receiver and change the first impedance in response to a foreign material;
a second resonator having a second impedance, the second resonator configured to change the second impedance in response to the foreign material;
a controller configured to,
select either one of the first resonator and the second resonator in response to a wireless charging control,
determine whether the foreign material is proximate to the power transmitter based on the change in the first impedance of the first resonator during a preparation of wireless charging, and
determine whether the foreign material is proximate to the power transmitter based on the change in the second impedance of the second resonator during an execution of the wireless charging; and
a wireless tag reader configured to sense a wireless tag proximate to the power receiver during the execution of the wireless charging, in response to the change in the second impedance of the second resonator,
wherein the controller is configured to immediately stop the wireless charging when the wireless tag reader senses the wireless tag, before the controller stops the wireless charging based on a determination that the foreign material is proximate to the power transmitter.

2. The power transmitter of claim 1, further comprising:
a first detector configured to detect the change in the first impedance of the first resonator and provide the detected change in the first impedance of the first resonator to the controller; and
a second detector configured to detect the change in the second impedance of the second resonator and provide the detected change in the second impedance of the second resonator to the controller.

3. The power transmitter of claim 2, wherein the second resonator has resonance characteristics corresponding to resonance characteristics of the first resonator.

4. The power transmitter of claim 1, wherein the controller is further configured to determine whether the foreign material is the wireless tag based on an output of the wireless tag reader.

5. The power transmitter of claim 1, wherein the controller is further configured to stop the preparation of the wireless charging, in response to the change in the first impedance of the first resonator being detected and the wireless tag reader sensing the wireless tag during the preparation of the wireless charging.

6. The power transmitter of claim 1, wherein the controller is further configured to stop wireless charging, in response to the change in the second impedance of the second resonator being detected and the wireless tag reader sensing the wireless tag during the execution of the wireless charging.

7. A power transmitter, comprising:
a first resonator having a first impedance, the first resonator configured to wirelessly supply power to a power receiver, and change the first impedance in response to a foreign material;
a second resonator having a second impedance, the second resonator configured to change the second impedance in response to the foreign material;
a wireless tag reader configured to sense a wireless tag disposed proximate to the power receiver while the first resonator wirelessly supplies the power to the power receiver, in response to the change in the second impedance of the second resonator being detected while the first resonator wirelessly supplies the power to the power receiver; and
a controller configured to,
determine whether the foreign material is proximate to the power transmitter based on the change in the first impedance of the first resonator during a preparation of a wireless charging, and
determine whether the foreign material is proximate to the power transmitter based on the change in the second impedance of the second resonator during an execution of the wireless charging,
wherein the controller is configured to immediately stop the wireless charging when the wireless tag reader senses the wireless tag, before the controller stops the wireless charging based on a determination that the foreign material is proximate to the power transmitter.

8. The power transmitter of claim 7, further comprising:
a first detector configured to detect the change in the first impedance of the first resonator; and
a second detector configured to detect the change in the second impedance of the second resonator.

9. The power transmitter of claim 8, wherein the second resonator has resonance characteristics that correspond to resonance characteristics of the first resonator.

10. The power transmitter of claim 7, wherein the first resonator is configured to stop power transmission to the power receiver, in response to the wireless tag reader sensing the wireless tag.

11. The power transmitter of claim 7, wherein the wireless tag reader is configured to sense the wireless tag disposed proximate to the power receiver during the preparation of the wireless charging.

12. The power transmitter of claim 11, wherein the first resonator is configured to stop the preparation of the wireless charging, in response to the wireless tag reader sensing the wireless tag disposed proximate to the power receiver during the preparation of the wireless charging.

13. The power transmitter of claim 7, wherein the first resonator and the second resonator each are formed of a wire configured in a coil shape, and the second resonator is wound around a periphery of the first resonator.

14. The power transmitter of claim 13, wherein the first resonator and the second resonator are on a same substrate.

* * * * *